United States Patent
Hertz-Shargel et al.

(10) Patent No.: US 11,687,689 B2
(45) Date of Patent: Jun. 27, 2023

(54) CAPACITY FORECASTING

(71) Applicant: EnergyHub, Inc., Brooklyn, NY (US)

(72) Inventors: Benjamin Hertz-Shargel, Roslyn Estates, NY (US); Varun Mehra, New York City, NY (US); Michael DeBenedittis, Brooklyn, NY (US)

(73) Assignee: Energy Hub, Inc., Brooklyn, NY (US)

( * ) Notice: Subject to any disclaimer, the term of this patent is extended or adjusted under 35 U.S.C. 154(b) by 227 days.

(21) Appl. No.: 17/019,983

(22) Filed: Sep. 14, 2020

(65) Prior Publication Data

US 2022/0083708 A1  Mar. 17, 2022

(51) Int. Cl.
   *G06F 30/20* (2020.01)
   *G06N 20/00* (2019.01)

(52) U.S. Cl.
   CPC .............. *G06F 30/20* (2020.01); *G06N 20/00* (2019.01)

(58) Field of Classification Search
   CPC .................................. G06F 30/20; G06N 20/00
   See application file for complete search history.

(56) References Cited

U.S. PATENT DOCUMENTS

| | | | |
|---|---|---|---|
| 7,552,100 B2 | 6/2009 | Chen | |
| 9,639,642 B2 | 5/2017 | Jetcheva et al. | |
| 10,241,528 B1* | 3/2019 | Frader-Thompson | ... F24F 11/80 |
| 10,746,425 B1 | 8/2020 | Frader-Thompson et al. | |
| 10,770,897 B1 | 9/2020 | Hertz-Shargel et al. | |
| 2004/0257059 A1 | 12/2004 | Mansingh et al. | |
| 2005/0091176 A1 | 4/2005 | Nishiuma et al. | |
| 2012/0316695 A1 | 12/2012 | Chen et al. | |
| 2017/0288455 A1* | 10/2017 | Fife | ......... H02J 3/004 |
| 2017/0373500 A1* | 12/2017 | Shafi | .................. G05B 13/027 |
| 2018/0219374 A1* | 8/2018 | Pavlak | ...................... H02J 3/00 |

(Continued)

OTHER PUBLICATIONS

Wang L, Mathew P, Pang X. Uncertainties in energy consumption introduced by building operations and weather for a medium-size office building. Energy and Buildings. Oct. 1, 2012;53:152-8. (Year: 2012).*

(Continued)

*Primary Examiner* — Chuen-Meei Gan
(74) *Attorney, Agent, or Firm* — Fish & Richardson P.C.

(57) ABSTRACT

Methods, systems, and apparatus, including computer programs encoded on a computer storage medium, for generating a load adjustment simulation and a capacity forecast. In one aspect, a method comprises: generating, using a simulation system, a load adjustment simulation that characterizes predicted energy consumption by a population of energy consuming devices based on performance of a current load adjustment event; generating, using the simulation system, a baseline load simulation that characterizes predicted energy consumption by the population of energy consuming devices based on non-performance of the current load adjustment event; determining, using the baseline load simulation, a load adjustment simulation error that is an estimate of an error between: (i) the load adjustment simulation, and (ii) actual energy consumption by the population of energy consuming devices based on performance of the current load adjustment event; and updating the load adjustment simulation using the load adjustment simulation error.

20 Claims, 8 Drawing Sheets

(56) References Cited

U.S. PATENT DOCUMENTS

2019/0132224 A1    5/2019  Verma et al.
2019/0236446 A1*  8/2019  Qin .......................... G06N 3/04
2020/0106269 A1*  4/2020  Hannon ................... H02J 3/14

OTHER PUBLICATIONS

Ji Y, Xu P. A bottom-up and procedural calibration method for building energy simulation models based on hourly electricity submetering data. Energy. Dec. 15, 2015;93:2337-50. (Year: 2015).*
energyhub.com, "Mercury DERMS load forecasting," [retrieved on Sep. 9, 2020], retrieved from: URL<https://cdn2.hubspot.net/hubfs/415845/Fact%20sheets/EnergyHub%20load%20forecasting%20fact%20sheet.pdf>, 2 pages.
Kontaxis et al., "DER load forecasting: A powerful tool for DSM and situational awareness," Energy Hub, Feb. 1, 2019, 7 pages.
PCT International Search Report and Written Opinion in International Appln. No. PCT/US2021/049093, dated Dec. 22, 2021, 12 pages.
Dehalwar et al., "Electricity Load Forecasting for Urban Area Using Weather Forecast Information," 2016 IEEE International Conference on Power and Renewable Energy, pp. 355-359.

\* cited by examiner

CAPACITY FORECASTING

FIELD

The present specification relates to capacity forecasting.

BACKGROUND

Grid operators may want to predict the electrical load, such as the electrical power consumption measured in megawatts (MW), on their grid over a period of time. In particular, grid operators may want to predict the electrical load on their grid during load adjustment events.

SUMMARY

This specification describes a load forecasting system and a capacity forecasting system that are each implemented as computer programs on one or more computers in one or more locations.

The load forecasting system uses a machine learning model that is trained on historical data characterizing historical patterns of energy consumption by a population of energy consuming devices to generate load forecasts that predict energy consumption over future time intervals. The population of energy consuming devices may include, e.g., heating, ventilation, and air conditioning (HVAC) systems, water heaters, electric vehicles, battery energy storage systems, and industrial equipment. The energy consuming devices may be connected to an electrical grid, i.e., such that they consume energy received through the grid. The energy consuming devices may be located, e.g., in residential buildings, commercial buildings, data centers, and industrial facilities.

The capacity forecasting system uses both the load forecasting system and device-specific energy consumption models to predict energy consumption by the energy consuming devices over time intervals during which load adjustment events are performed. Performing a load adjustment event refers to implementing a control strategy for controlling energy consumption by the population of energy consuming devices. The control strategy may be directed to reducing energy consumption of the energy consuming devices while maintaining one or more criteria for performance. For instance, in implementations in which the energy consuming devices include HVAC systems, the control strategy may be directed to reducing energy consumption of the HVAC systems while maintaining certain criteria for comfort in the sites where the HVAC systems are located.

According to a first aspect, there is provided a method performed by one or more data processing apparatus for predicting load measurements at future time points, wherein a load measurement at a time point characterizes a cumulative measure of energy consumption by a population of energy consuming devices at the time point, the method comprising: generating an input load array that includes a respective load value for each of a plurality of time points, wherein: for a plurality of previous time points, the input load array includes load values for the previous time points that define load measurements at the previous time points; and for a plurality of future time points, the input load array includes load values for the future time points that are masked values; and processing the input load array using a load forecasting model to unmask the masked values corresponding to the future time points, comprising generating an output that defines, for the plurality of future time points, predicted load measurements at the future time points.

In some implementations, the load values included in the input load array correspond to time points spanning a predefined time period.

In some implementations, generating the output that defines, for the plurality of future time points, predicted load measurements at the future time points comprises: generating an output that comprises an output load array, wherein the output load array includes a respective load value for each of the time points spanning the predefined time period, wherein the predicted load measurements at the future time points are defined by load values corresponding to the future time points in the output load array.

In some implementations, the predefined time period is a 24-hour time period starting at a predefined starting time and ending at a predefined ending time.

In some implementations, the method further comprises generating a weather data array that characterizes outdoor weather at each of the plurality of time points, wherein the load forecasting model processes both the input load array and the weather data array.

In some implementations, the weather data array characterizes actual outdoor weather at the plurality of previous time points, and predicted outdoor weather at the plurality of future time points.

In some implementations, the load forecasting model is trained on a set of training examples using supervised machine learning training techniques, wherein the set of training examples are generated using stored historical data, wherein each training examples comprises: (i) a training input to the load forecasting model that comprises a masked representation of a historical load array, and (ii) a target output that comprises an unmasked representation of the historical load array.

In some implementations, the load forecasting model comprises a neural network model.

In some implementations, the neural network model comprises a plurality of fully-connected neural network layers.

In some implementations, the population of energy consuming devices comprise heating, ventilation, and air conditioning (HVAC) devices.

In some implementations, the masked values are default values.

According to another aspect, there is provided a method performed by one or more data processing apparatus, the method comprising: generating, using a simulation system, a load adjustment simulation that characterizes predicted energy consumption by a population of energy consuming devices based on performance of a current load adjustment event; generating, using the simulation system, a baseline load simulation that characterizes predicted energy consumption by the population of energy consuming devices based on non-performance of the current load adjustment event; determining, using the baseline load simulation, a load adjustment simulation error that is an estimate of an error between: (i) the load adjustment simulation, and (ii) actual energy consumption by the population of energy consuming devices based on performance of the current load adjustment event; and updating the load adjustment simulation using the load adjustment simulation error.

In some implementations, the simulation system comprises a respective energy consumption model for each device in the population of energy consuming devices, wherein the energy consumption model for a device is configured to simulate energy consumption by the device based on one or more controls applied to the device to control operation of the device.

In some implementations, generating the load adjustment simulation comprises: simulating energy consumption by each device in the population of devices based on performance of the load adjustment event using the respective energy consumption model for each device; and generating the load adjustment simulation by aggregating the simulated energy consumption by each device in the population of devices based on performance of the load adjustment event.

In some implementations, generating the baseline load simulation comprises: simulating energy consumption by each device in the population of devices based on non-performance of the load adjustment event using the respective energy consumption model for each device; and generating the baseline load simulation by aggregating the simulated energy consumption by each device in the population of devices based on non-performance of the load adjustment event.

In some implementations, determining the load adjustment simulation error comprises: processing data characterizing previous energy consumption by the population of energy consuming devices using a load forecasting system to generate a baseline load forecast that characterizes predicted energy consumption by the population of energy consuming devices based on non-performance of the current load adjustment event; determining a current baseline simulation error between: (i) the baseline load simulation, and (ii) the baseline load forecast; and determining the load adjustment simulation error based on baseline simulation error.

In some implementations, determining the load adjustment simulation error based on the baseline simulation error comprises: determining a respective baseline simulation error for each of a plurality of previous load adjustment events; determining a respective weight factor for each previous load adjustment event based on: (i) the baseline simulation error for the previous load adjustment event, and (ii) the baseline simulation error for the current load adjustment event; and determining the load adjustment simulation error using the weight factors for the previous load adjustment events.

In some implementations, determining the load adjustment simulation error using the weight factors for the previous load adjustment events comprises: determining a respective load adjustment simulation error for each of the plurality of previous load adjustment events; scaling the load adjustment simulation error for each previous load adjustment event by the weight factor for the previous load adjustment event; and determining the load adjustment simulation error for the current load adjustment event by combining the load adjustment simulation errors for the previous load adjustment events in accordance with the weight factors for the previous load adjustment events.

In some implementations, determining the load adjustment simulation error for the current load adjustment event by combining the load adjustment simulation errors for the previous load adjustment events in accordance with the weight factors for the previous load adjustment events comprises: scaling the load adjustment simulation error for each previous load adjustment event by the weight factor for the previous load adjustment event; and summing the load adjustment simulation errors for the previous load adjustment events.

According to another aspect there is provided a system comprising: one or more computers; and one or more storage devices communicatively coupled to the one or more computers, wherein the one or more storage devices store instructions that, when executed by the one or more computers, cause the one or more computers to perform operations to implement the methods described herein.

According to another aspect there are provided one or more non-transitory computer storage media storing instructions that when executed by one or more computers cause the one or more computers to perform operations to implement the methods described herein.

Particular embodiments of the subject matter described in this specification can be implemented so as to realize one or more of the following advantages.

The load forecasting system described in this specification can accurately forecast the load generated by a population of energy consuming devices over a future time interval using a load forecasting model. The load generated by a population of energy consuming devices may be approximately periodic, e.g., over a 24-hour time period. The load forecasting model may be configured to receive a fixed-size input that characterizes the load over a predefined time period, e.g., a 24-hour time period, where the unknown load measurements for future time points are replaced by "masked" (e.g., default) values. The load forecasting model is trained using supervised machine learning techniques to generate load forecasts by unmasking the masked values in the input, e.g., by generating a fixed-size output where the masked portion of the input is replaced by the load forecast. Training the load forecasting model to generate load forecasts by unmasking fixed-size inputs encourages the load forecasting model to learn the underlying periodicity in the load data, and thereby enables the load forecasting model to generate more accurate load forecasts.

The capacity forecasting system described in this specification can accurately predict the load generated by a population of energy consuming devices during a load adjustment event by leveraging the complementary characteristics of load simulations generated using device-specific energy consumption models and load forecasts generated by a load forecasting system. In particular, the device-specific energy consumption models may enable simulation of the effects of specified control strategies being applied to each device in the population of devices, but are optimized to simulate energy consumption at the device-level rather than the population-level. In some implementations, the load forecasting system may use a load forecasting model that is optimized to generate population-level load forecasts, but may be unable to directly account for the effects of performing load adjustment events. The capacity forecasting system can simulate the load during a load adjustment event using device-specific energy consumption models, and then adjust the simulated load to account for potential simulation errors using load forecasts generated by the load forecasting system. Predicting the load generated by a population of energy consuming devices using both device-specific energy consumption models and a load forecasting system may enable the capacity forecasting system to generate more accurate load predictions, and therefore, capacity forecasts.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
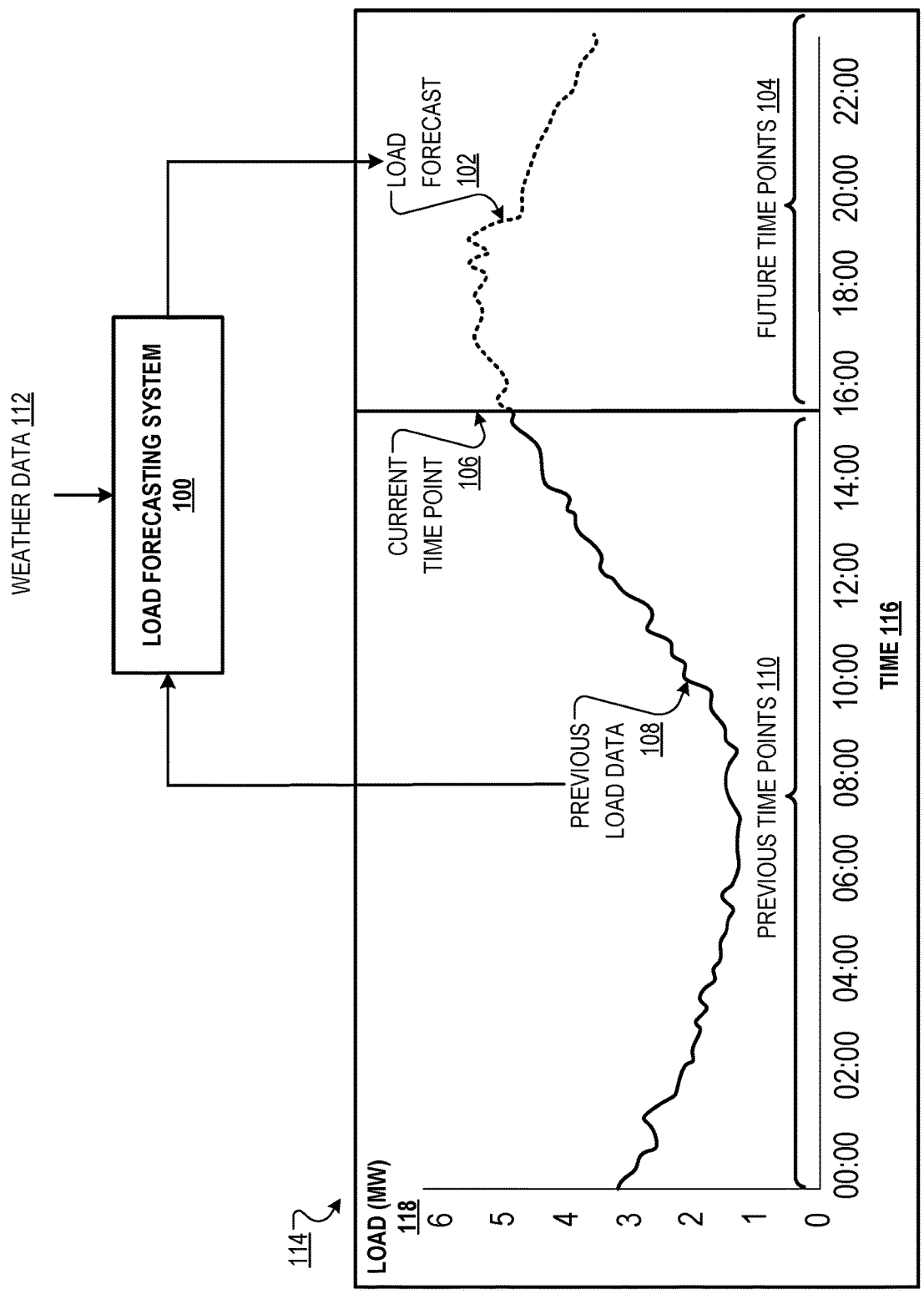
FIG. 1 shows an example data flow where a load forecasting system generates a load forecast.

FIG. 1 shows an example data flow where a load forecasting system 100 generates a load forecast 102 that includes a respective predicted load measurement for each of one or more future time points 104 (i.e., after a current time point 106). The predicted load measurement for each future time point defines a prediction for an actual load measurement at the future time point. The load forecasting system 100 generates the load forecast 102 by processing previous load data 108 that includes a respective actual load measurement for each of one or more previous time points 110 (i.e., before the current time point 106).

A load measurement for a time point refers to numerical data (e.g., a scalar numerical value) that characterizes a cumulative (e.g., total or net) measure of electrical energy consumption by a population of energy consuming devices at the time point. A load measurement can be expressed in any appropriate unit of measurement, e.g., megawatts (MW). The energy consuming devices may be connected to an electrical grid, i.e., such that they consume energy received through the grid, and the load measurement for a time point may characterize the cumulative load on the grid.

The load forecasting system 100 may process a variety of other inputs (e.g., in addition to the previous load data 108) that may be predictive of future energy consumption by the population of energy consuming devices. For example, the load forecasting system 100 may process weather data 112 that characterizes the weather in the vicinity of the sites where the energy consuming devices are located. The weather data 112 may include one or more actual weather measurements for each previous time point 110, and one or more predicted weather measurements for each future time point 104. A "weather measurement" for a time point may be, e.g., a temperature measurement (e.g., measured in Fahrenheit), a humidity measurement (e.g., measured in grams of water per cubic meter of air), or any measurement characterizing atmospheric conditions at the time point. The weather measurements may be average measurements over a geographical region over which the population of energy consuming devices are distributed. The weather data 112 may be particularly predictive of future energy consumption by HVAC systems, e.g., which may consume more energy to maintain interior temperature at a set point as the outdoor temperature deviates more from the set point.

The graph 114 illustrates an example of previous load data 108 (i.e., represented by the solid line) processed by the load forecasting system 100, and a load forecast 102 (i.e., represented by the dashed line) generated by the load forecasting system 100, over a 24-hour time period. The horizontal axis of the graph 114 represents time 116, the vertical axis of the graph 114 represents load 118 (measured in MW), and the height of a line on the graph 114 at a respective time point represents the (actual or predicted) load measurement at the time point.

Load forecasts 102 generated by the load forecasting system 100 can be used in a variety of ways. For example, load forecasts 102 may be used to determine that the predicted load over a future time interval exceeds a maximum acceptable load, and that a load adjustment event should be performed to reduce energy consumption over the future time interval. As another example, load forecasts 102 may be processed by a capacity forecasting system as part of predicting energy consumption by the population of energy consuming devices over a future time interval during which a load adjustment event is performed. An example implementation of a capacity forecasting system is described in more detail with reference to FIG. 4.

Figure 2:
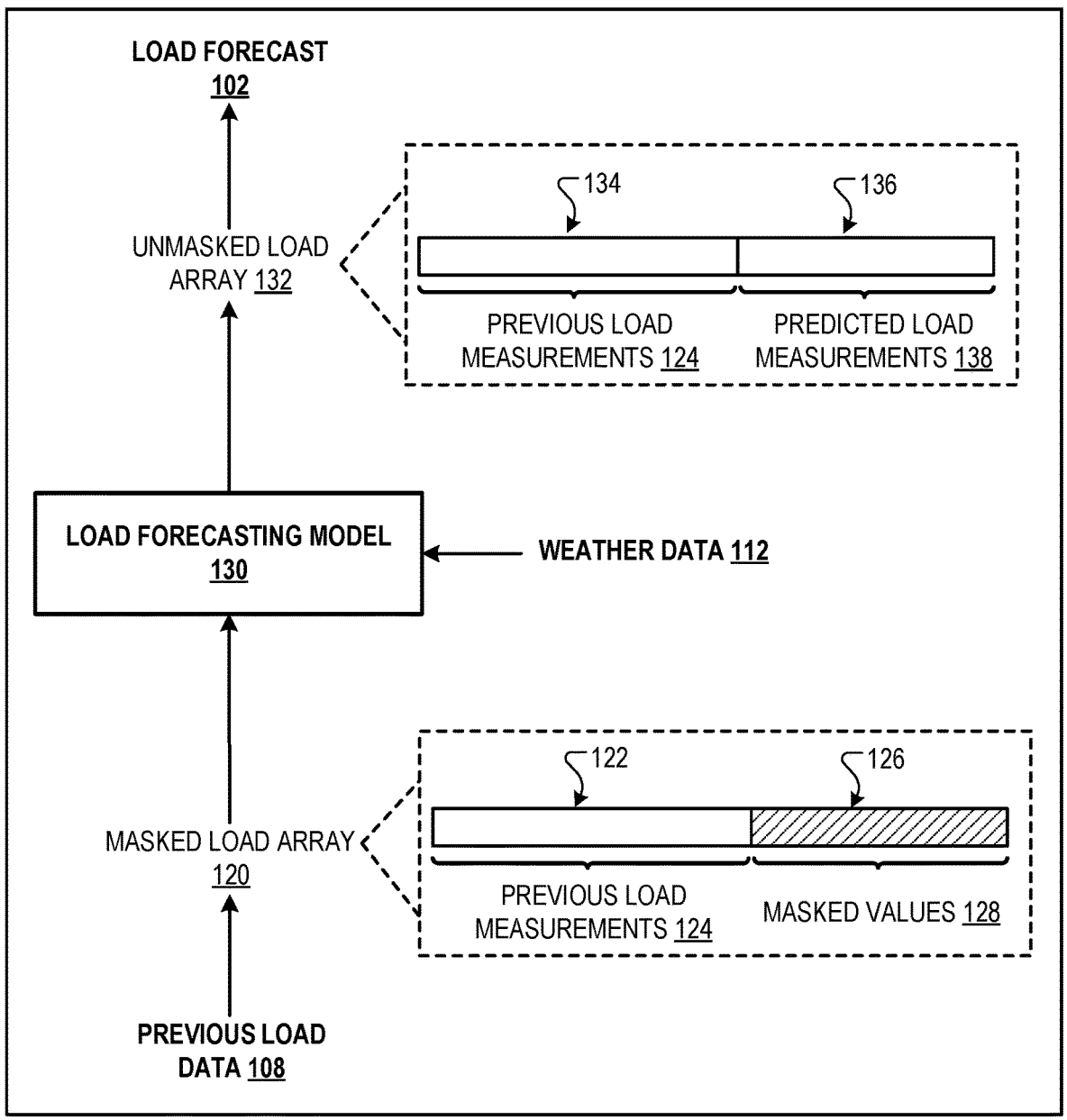
FIG. 2 shows an example load forecasting system.

FIG. 2 shows an example load forecasting system 100. The load forecasting system 100 is an example of a system implemented as computer programs on one or more computers in one or more locations in which the systems, components, and techniques described below are implemented.

The load forecasting system 100 receives previous load data 108 that includes a respective load measurement for each "previous" time point in a sequence of time points spanning a predefined time period. The previous time points may include each time point in the sequence of time points starting from the first time point and extending to a "current" time point in the sequence of time points. In the example illustrated with reference to the graph 114 in FIG. 1, the predefined time period may be a 24-hour time period starting at 00:00 and extending to 24:00, the sequence of time points may be time points at 15 minute increments spanning the 24-hour time period, and the previous time points may include each time point starting from 00:00 and extending the current time point of 16:00.

The load forecasting system 100 processes the previous load data 108 to generate a load forecast 102 that includes a respective load measurement for each "future" time point starting from the current time point and extending to the last time point in the sequence of time points. In the example illustrated with reference to the graph 114 in FIG. 1, the load forecast 102 may include a respective load measurement for time points at 15 minute increments starting from the current time point 16:00 and extending to the last time point 24:00.

As part of generating the load forecast 102, the load forecasting system 100 processes the previous load data 108 to generate a masked load array 120. Throughout this specification, an "array" refers to an ordered collection of numerical values, e.g., a vector of numerical values.

The masked load array 120 has a predefined length, e.g., with a number of components equal to the number of time points in the sequence of time points. Each component of the masked load array 120 corresponds to a respective time point in the sequence of time points. For example, if the sequence of time points span the time period 00:00 to 24:00 at 15 minute increments, then the first component of the masked load array 120 may correspond to time point 00:00, the second component may corresponding to time point 00:15, and so on.

The load forecasting system 100 may set the value of each component of masked load array 120 that corresponds to a previous time point to be the load measurement for the previous time point, e.g., as defined by the previous load data 108. The load measurements for the future time points may be unknown (i.e., as of the current time point), and therefore the load forecasting system 100 may set the value of each component of the masked load array 120 that corresponds to a future time point to be a "masked" value. The masked value may be, e.g., a default (predefined) value, e.g., the value 0. In the example masked load array 120, the first portion 122 of the masked load array defines the previous load measurements 124, and the second portion 126 of the masked load array is set to the masked values 128.

The load forecasting model 130 processes the masked load array 120 (and optionally, weather data 112, as will be described in more detail below) using a load forecasting model 130 to "unmask" the masked values in the masked load array. More specifically, the load forecasting model 130 processes an input including the masked load array 120 to generate a corresponding unmasked load array 132. Generally, the unmasked load array 132 is an array of numerical values having a respective component corresponding to each time point in the sequence of time points, similar to the masked load array 120. However, in contrast to the masked load array 120, the respective value of each component of the unmasked load array corresponding to a future time point defines a predicted load measurement at the future time point. That is, the load forecasting model 130 unmasks the masked values in the masked load array 120 by replacing them with predicted load measurements corresponding to the future time points. In the example unmasked load array 132, the first portion 134 of the unmasked load array 132 defines the previous load measurements 124, and the second portion 136 of the unmasked load array 132 defines the predicted load measurements 138 for the future time points.

In addition to processing the masked load array 120, the load forecasting model 130 may process additional "explanatory" data, e.g., data that may facilitate effectively unmasking the masked load array 120 to predict load measurements for the future time points. For example, the load forecasting model 130 may process the weather data 112 in addition to the masked load array 120, where the weather data 112 includes one or more (actual or predicted) weather measurements (e.g., temperature measurements) for each respective time point in the predefined sequence of time points. The weather data 112 may be represented as an array of numerical values, and concatenated to the masked load array 120 prior to being provided as an input to the load forecasting model 130.

The load forecasting system 100 may output the predicted load measurements 138 included in the unmasked load array 132 (e.g., defined by the values of the components of the unmasked load array 132 corresponding to the future time points) as the load forecast 102. Optionally, the load forecasting system 100 may apply one or more operations to the predicted load measurements 138 prior to outputting them as the load forecast. For example, the load forecasting system 100 may apply a filtering operation to the predicted load measurements 138, e.g., using a Gaussian filtering kernel, to smooth and regularize the predicted load measurements 138.

In some cases, the previous load measurements 124 included in the unmasked load array 132 (e.g., defined by the values of the components of the unmasked load array 132 corresponding to previous time points) may not match the previous load measurements 124 included in the masked load array 120. That is, the unmasked load array 132 may not preserve the known values of the previous load measurements 124. However, the previous load measurements 124 included in the unmasked load array 132 are not part of the load forecast 102, and may be disregarded.

The load forecasting model 130 is a machine learning model, e.g., a model having a set of parameter values that are trained on a set of training data using machine learning training techniques. The load forecasting model 130 can be implemented as any appropriate machine learning model that can perform the described functions of the load forecasting model 130, e.g., processing a masked load array to generate a corresponding unmasked load array. For example, the load forecasting model 130 may be implemented as an artificial neural network model having any appropriate neural network architecture. In one example, the load forecasting model may have a neural network architecture that includes a sequence of neural network layers including an input layer, one or more hidden layers, and an output layer. The input layer may be configured to receive the masked load array, and optionally other explanatory data, e.g., weather data 112. Each hidden layer may be, e.g., a fully-connected neural network layer that is configured to process the output of the preceding neural network layer. The output layer may be configured to output the unmasked load array 132.

The load forecasting system 100 may generate training data that includes a collection of training examples for training the load forecasting model using stored historical data, e.g., historical load arrays that each define a sequence of previously observed load measurements over a sequence of time points. The stored historical data may include a historical weather array corresponding to each historical load array that defines a sequence of previously observed weather measurements over the sequence of time points. The load forecasting system 100 may use a historical load array (and optionally, a corresponding historical weather array) to generate a training example. For example, the load forecasting system 100 may randomly sample a component of the historical load array, and mask each component of the historical load array starting from the randomly sampled component and extending to the last component of the historical load array. The load forecasting system 100 may then generate a training example that includes: (i) a training input that includes the masked historical load array (and optionally, the corresponding historical weather array), and (ii) a target output that specifies the original (e.g., unmasked) historical load array. The target output defines the output that should be generated by the load forecasting model 130 by processing the training input. Generating training examples where randomly determined amounts of the historical load array are masked may enable the load forecasting model 130 to learn to extrapolate load forecasts from varying amounts of previous load data.

The load forecasting system 100 may train the load forecasting model 130 on the training data using any appropriate machine learning training technique. For example, if the load forecasting model 130 is implemented as a neural network, the load forecasting system 100 may train the load forecasting model 130 by iteratively adjusting the parameter values of the load forecasting model 130 using a stochastic gradient descent training technique to optimize an objective function. For each training example, the objective function may measure an error between: (i) the unmasked load array generated by the load forecasting model 130 by processing the training input, and (ii) the corresponding target output. In one example, the objective function $\mathcal{L}$ may be given by:

$$\mathcal{L}(\hat{L}, L) = \sum_{i=1}^{N} \alpha_i \cdot |\hat{L}(i) - L(i)| \quad (1)$$

where $\hat{L}$ denotes an unmasked load array generated by the load forecasting model 130, L denotes the corresponding target output, N denotes the number of time points in the sequence of time points, and $\{\alpha_i\}_{i=1}^{N}$ denote constant weighting factors. In some cases, the weighting factors $\alpha_i$ corresponding to time points associated with "peak load" (i.e., periods of time when the load is expected to be highest, e.g., the middle of the afternoon) may have higher values than the other weighting factors. This weighting scheme may encourage the load forecasting model 130 to be most accurate at periods of peak load. In some cases, the weighting factors $\alpha_i$ corresponding to time points in the unmasked portion of the historical load array included in the training input may be set to a low value, e.g., zero, to encourage the load forecasting model 130 to focus on accurately unmasking the historical load array.

The load forecasting system 100 may periodically (e.g., weekly or monthly) retrain the load forecasting model using more recent stored historical data. The load forecasting system 100 may retrain the load forecasting model "from scratch" (e.g., from default or random parameter values), or from the existing parameter values of the load forecasting model. The load forecasting model may periodically generate load forecasts over a shorter time scale, e.g., every 15 minutes.

Figure 3A:
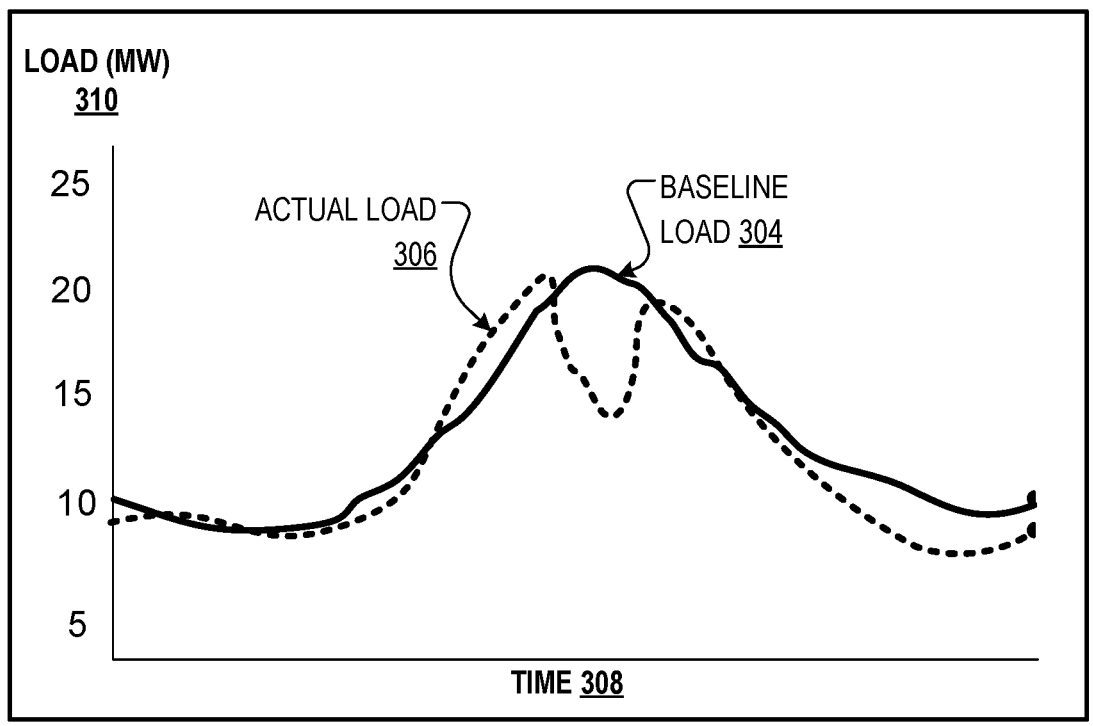
FIG. 3A shows: (i) a baseline load curve that represents the expected baseline load, e.g., if a load adjustment event were not performed, and (ii) an actual load curve that resulted from the performance of a load adjustment event.

Generally, the training data used to train the load forecasting model 130 is generated using stored historical data defining sequences of previously observed load measurements. Therefore, the load forecasting model 130 learns to generate load forecasts 102 that characterize the expected "baseline" (e.g., typical) load generated by the population of energy consuming devices, e.g., in the absence of load adjustment events. However, in some cases, load adjustment events may be performed to alter the baseline load generated by the population of energy consuming devices, e.g., to increase or reduce the load generated over certain time periods relative to the baseline load. For example, the graph 302 in FIG. 3A shows: (i) a baseline load curve 304 that represents the expected baseline load, e.g., if a load adjustment event were not performed, and (ii) an actual load curve 306 that resulted from the performance of a load adjustment event. The horizontal axis of the graph 302 represents time 308 and the vertical axis of the graph 302 represents load 310 (measured in MW).

Figure 3B:
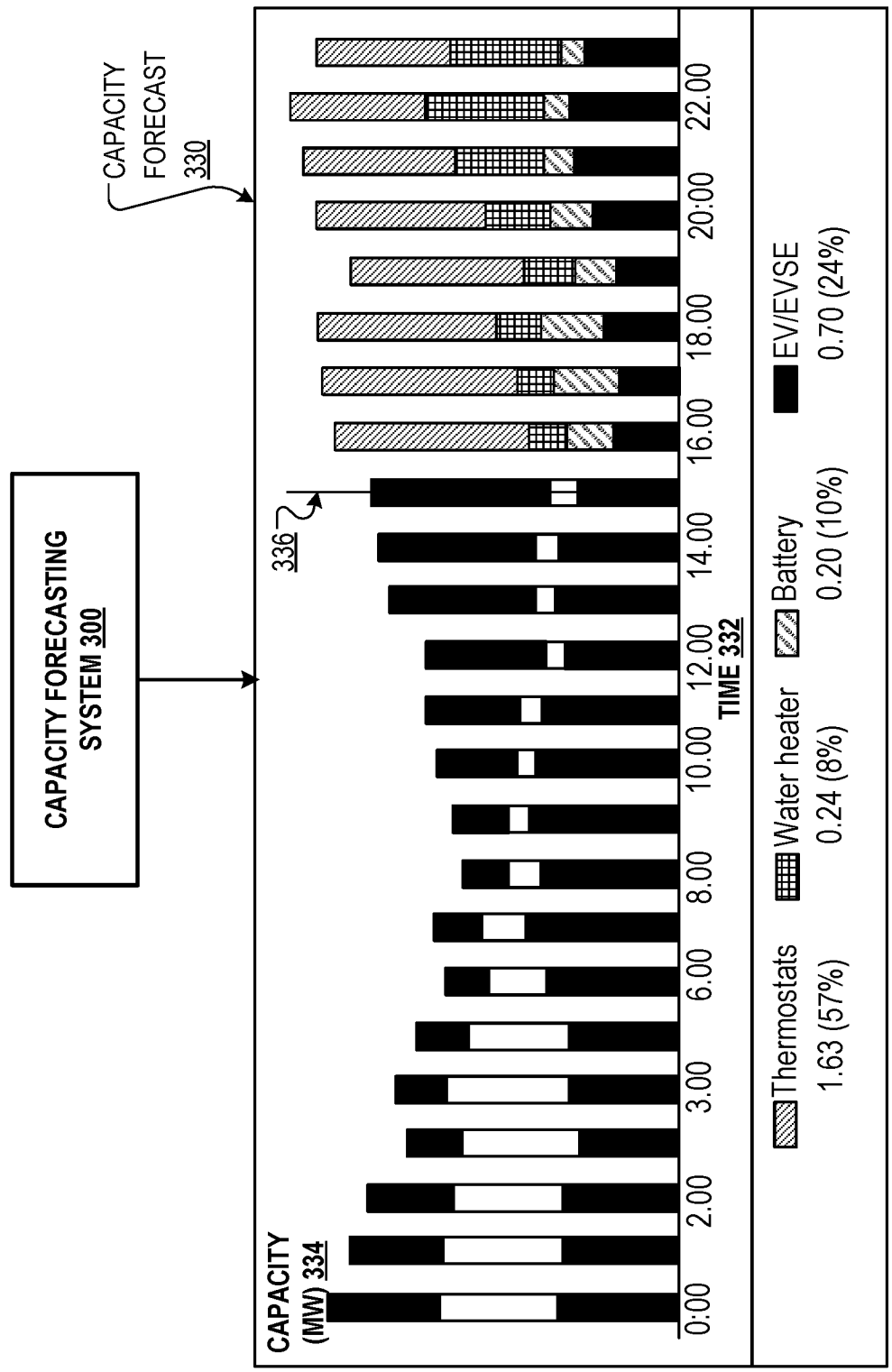
FIG. 3B shows an example of a capacity forecast that may be generated by a capacity forecasting system.

A capacity forecasting system may generate a capacity forecast that represents an estimate of the capacity that would be achieved by performing a load adjustment event. The capacity that would be achieved by performing a load adjustment event may refer to the difference between: (i) the expected baseline load if the load adjustment event is not performed, and (ii) the predicted load if the load adjustment event is performed. For example, referring to FIG. 3A, the capacity may be an estimate of the difference between: (i) the baseline load curve 304 that represents the expected baseline load, and (ii) the actual load curve 306 that results from performing the load adjustment event. FIG. 3B illustrates an example of a capacity forecast 330 generated by a capacity forecasting system 300. The horizontal axis of the capacity forecast 330 represents time 332 and the vertical axis of the capacity forecast 330 represents capacity 334, e.g., measured in MW. The vertical line 336 can represent the current time point, such that the vertical bars before the current time point represent previously achieved capacity, and the vertical bars after the current time represent predicted future capacity. In this example, the capacity forecast at each time point is broken down by device type, e.g., thermostats, water heaters, batteries, and electrical vehicles (EVs).

Figure 4:
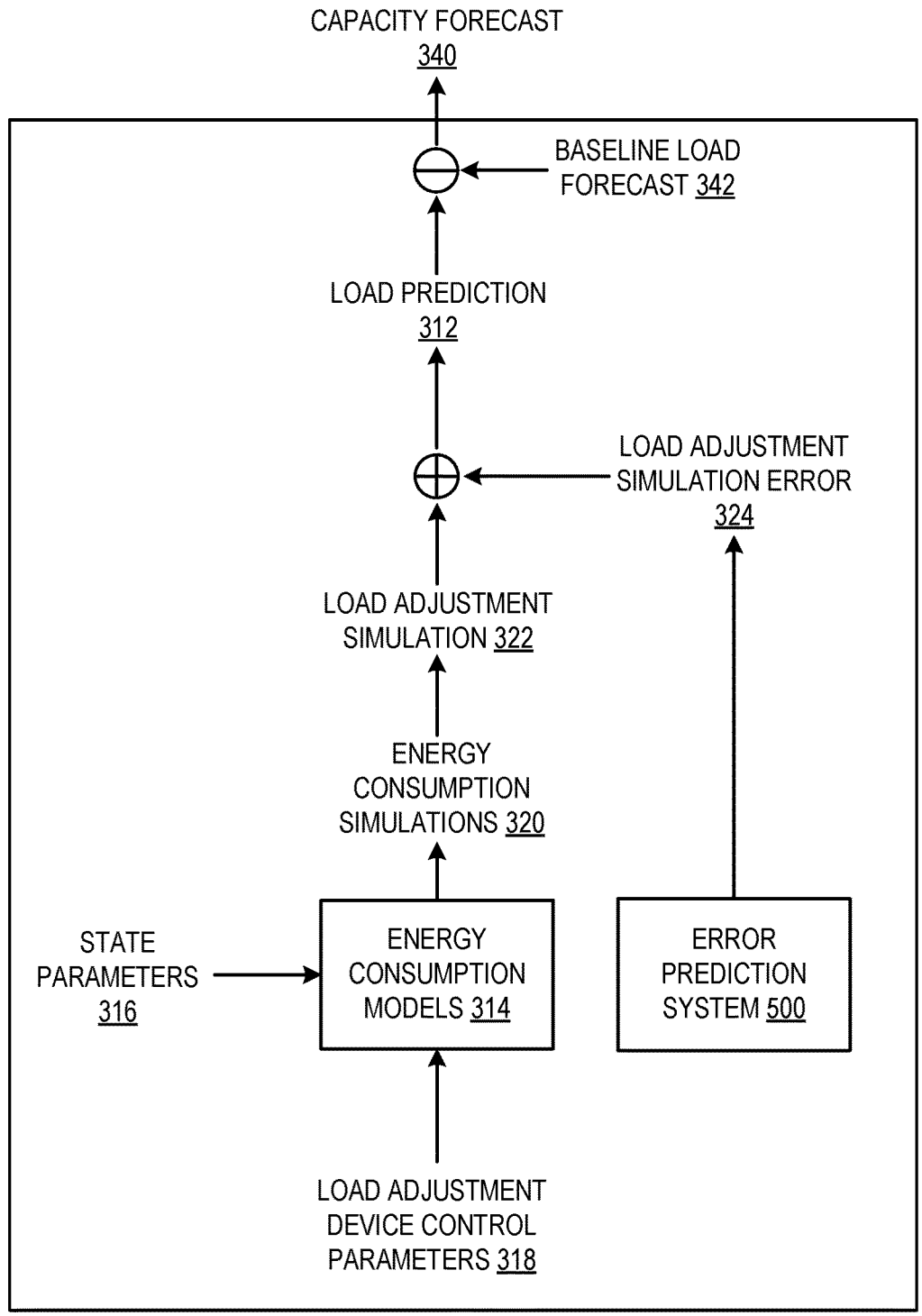
FIG. 4 shows an example capacity forecasting system.

FIG. 4 shows an example capacity forecasting system 300. The capacity forecasting system 300 is an example of a system implemented as computer programs on one or more computers in one or more locations in which the systems, components, and techniques described below are implemented.

The capacity forecasting system 300 is configured to generate a capacity forecast 340 that includes a respective predicted capacity measurement for each time point in a time interval during which a load adjustment event is performed. A predicted capacity measurement at a time point may refer to an estimate of the available capacity at the time point that will be achieved by performing the load adjustment event. The capacity forecasting system 300 determines the capacity forecast as a difference between: (i) a baseline load forecast 342 that estimates the baseline load if the load adjustment event is not performed, and (ii) a load prediction 312 that estimates the load if the load adjustment event is performed.

The capacity forecasting system 300 generates the load prediction 312 using: (i) a respective device-specific energy consumption model 314 for each device in the population of energy consuming devices, and (ii) an error prediction system 500, which will each be described in more detail next.

The capacity forecasting system 300 includes a respective energy consumption model 314 for each device in the population of energy consuming devices. Generally, an energy consumption model for a device may be configured to process: (i) a set of control parameters for a time interval, and (ii) a set of state parameters for the time interval, to simulate energy consumption by the device over the time interval. More specifically, the energy consumption model may generate an energy consumption simulation for the time interval that includes a simulated energy consumption measurement (e.g., expressed in watts) for each time point in the time interval. The simulated energy consumption measurement for a time point predicts the energy consumption by the device at the time point.

The set of control parameters for the time interval may define a set of controls to be applied to the device to control the operation of the device, and in particular, the rate of energy consumption of the device, over the time interval. For example, the control parameters for a heating/cooling system at a site may define a respective temperature set point for each time point in the time interval, where the heating/cooling system operates to maintain the temperature at the site within a tolerance range of the set point.

The set of state parameters for the time interval may characterize the state of the device, the environment in the vicinity of the device, or both, over the time interval. For example, the state parameters for a heating/cooling system at a site may include weather data characterizing outdoor weather in the vicinity of the site over the time interval (e.g., including predicted weather measurements for each time point in the time interval), initial conditions of indoor temperature at the site, and mode data characterizing the mode of the heating/cooling system over the time interval (e.g., heat mode, cool mode, automatic mode, etc.).

The energy consumption model for a device includes a set of device-specific energy consumption model parameters, and the energy consumption model processes the control and state parameters for a time interval in accordance with the energy consumption model parameters to generate the energy consumption simulation for the time interval. In one example, the energy consumption model parameters for a heating/cooling system at a site may include an internal heat gain parameter (e.g., representing the amount of heat generated at the site due to factors external to the heating/cooling system) and a thermal product parameter (e.g., representing a product of the thermal capacitance and thermal resistance of the site). The energy consumption model parameters for a device can be calibrated based on stored historical data that characterizes: (i) energy consumption by the device, and (ii) the values of control parameters and state parameters, over previous time intervals. Example techniques for determining an energy consumption model for a heating/cooling system at a site are described with reference to U.S. Pat. No. 10,746,425, which is incorporated by reference herein.

The capacity forecasting system 300 obtains respective state parameters 316 and "load adjustment" control parameters 318 for the time interval during which the load adjustment event is performed. The load adjustment control parameters 318 for each device may be optimized to achieve an objective of the load adjustment event, e.g., a target load curve representing a target for cumulative energy consumption by the population of energy consuming devices over the time interval of the load adjustment event. The target load curve may be defined by a respective target load measurement for each time point in the time interval of the load adjustment event. Example techniques for optimizing the control parameters for each device in a population of devices to achieve an objective of a load adjustment event are described in more detail with reference to U.S. patent application Ser. No. 15/785,533, which is incorporated by reference herein.

The capacity forecasting system 300 processes the state parameters 316 and load adjustment control parameters 318 for each device using the corresponding energy consumption model 314 for the device to generate a respective energy consumption simulation 320 for the device over the time interval of the load adjustment event. The capacity forecasting system 300 then aggregates the energy consumption simulations 320 to generate a load adjustment simulation 322 that estimates the load generated by the population of energy consuming devices over the time interval of the load adjustment event. The load adjustment simulation 322 may include a simulated load for each time point in the time interval of the load adjustment event, where the simulated load for a time point is an estimate of the load generated by the population of energy consuming devices at the time point. The capacity forecasting system 300 may determine the simulated load for a time point, e.g., by summing (or otherwise aggregating) the simulated energy consumption of each device at the time point, as defined by the device-specific energy consumption simulations 320.

The energy consumption models 314 enable the capacity forecasting system 300 to simulate the respective energy consumption of each device in the population of energy consuming devices during a load adjustment event. However, the energy consumption models are optimized to simulate energy consumption at the device-level rather than the population-level, in contrast to the load forecasting system described with reference to FIG. 1-2, which uses a load forecasting model that is optimized to forecast energy consumption at the population-level. In some implementations, the load forecasting system may generate load forecasts that predict the baseline load generated by the population of energy consuming devices, without being able to account for performance of load adjustment events. Therefore, the capacity forecasting system 300 uses an error prediction system 500 to leverage the complementary characteristics of the energy consumption models and the load forecasting system, as will be described in more detail below.

The error prediction system 500 generates a load adjustment simulation error 324 that defines a predicted error between: (i) the load adjustment simulation 322, and (ii) the actual load, at each time point in the time interval of the load adjustment event. An example of an error prediction system 500 is described in more detail with reference to FIG. 5.

The capacity forecasting system 300 generates the load prediction 312 for the time interval of the load adjustment event by combining the load adjustment simulation 322 and the load adjustment simulation error 324. For example, the capacity forecasting system 300 may generate the load prediction 312 by summing the load adjustment simulation 322 and the load adjustment simulation error 324. More specifically, the predicted load specified by the load prediction 312 for each time point may be defined as a sum of the simulated load for the time point (i.e., as specified by the load adjustment simulation 322) and the predicted error for the time point (i.e., as specified by the load adjustment simulation error 324).

The capacity forecasting system 300 may generate the baseline load forecast 342 in any of a variety of ways. For example, the capacity forecasting system 300 may generate the baseline load forecast 342 as an average of multiple historical baseline loads over the time period of the load adjustment event. As another example, the capacity forecasting system 300 may generate the baseline load forecast 342 using the load forecasting system described with reference to FIG. 2.

The capacity forecasting system 300 may determine the capacity forecast 340 to be the difference between the baseline load forecast 342 and the load prediction 312. For example, the capacity forecasting system 300 may generate the capacity forecast 340 by subtracting the load prediction 312 from the baseline load forecast 342.

The capacity forecasting system 300 may generate updated capacity forecasts at regular intervals, e.g., every 15 minutes.

Figure 5:
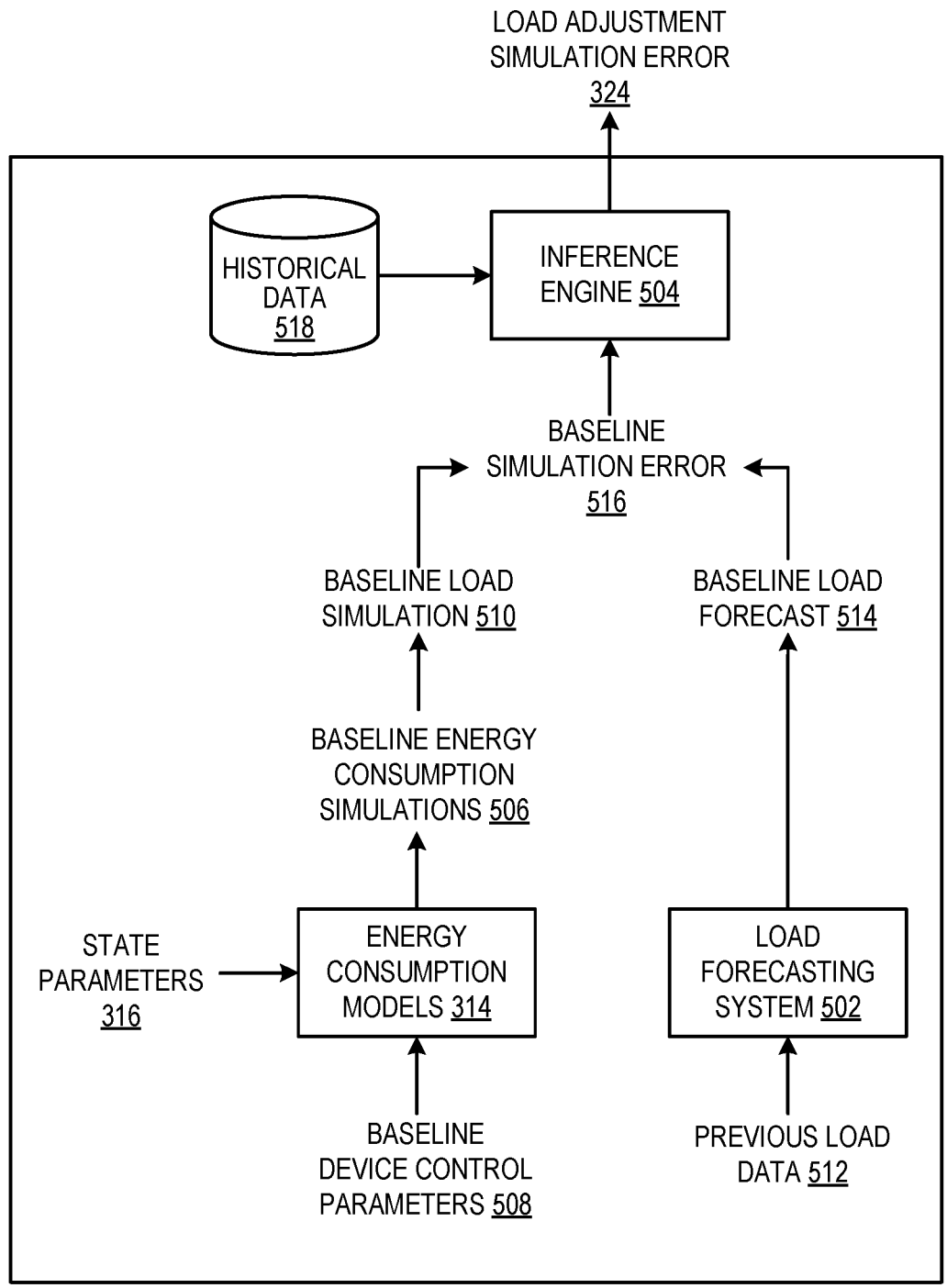
FIG. 5 shows an example error prediction system.

FIG. 5 shows an example error prediction system 500. The error prediction system 500 is an example of a system implemented as computer programs on one or more computers in one or more locations in which the systems, components, and techniques described below are implemented.

The error prediction system 500 generates a load adjustment simulation error 324 that defines a predicted error between: (i) a load adjustment simulation defining a simulated load over the time interval of a load adjustment event, and (ii) the actual load over the time interval of the load adjustment event. The load adjustment simulation for the load adjustment event is generated by simulating the energy consumption of each device in the population of energy consuming devices during the load adjustment event using device-specific energy consumption models, and aggregating the simulated energy consumption of each device. Generating a load adjustment simulation for a load adjustment event is described in more detail above with reference to FIG. 4.

The system 500 generates the load adjustment simulation error 324 using device-specific energy consumption models 314, a load forecasting system 502, and an inference engine 504, as will be described in more detail next.

The system 500 uses the energy consumption model 314 for each device in the population of energy consuming devices to generate a "baseline" energy consumption simulation 506 for the device, e.g., that simulates energy consumption by the device if the load adjustment event is not performed. The system 500 generates the baseline energy consumption simulation 506 for a device by processing a set of "baseline" control parameters 508 and a set of state parameters 316 for the device using an energy consumption model 314 for the device. The baseline control parameters 508 for the device define the controls that control the operation of the device if the load adjustment event is not performed. For example, the baseline control parameters for a heating/cooling system at a site may define respective temperature set points for the heating/cooling system that are specified by a user of the device, e.g., by a thermostat at the site. The state parameters 316 for the device characterize the state of the device, the environment in the vicinity of the device, or both, e.g., the state parameters for a heating/cooling system at a site may include outdoor weather data and initial conditions of indoor temperature at the site.

The system 500 aggregates the baseline energy consumption simulations 506 for the devices to generate a baseline load simulation 510 that estimates the load generated by the population of energy consuming devices if the load adjustment event is not performed. The system 500 may generate the baseline load simulation 510 by summing (or otherwise aggregating) the baseline energy consumption simulations 506 for the devices in the population of energy consuming devices.

In addition to generating the baseline load simulation 510, the system 500 processes previous load data 512 using the load forecasting system 502 to generate a baseline load forecast 514. The baseline load forecast 514 estimates the load generated by the population of energy consuming devices if a load adjustment event is not performed. Generally, the load forecasting system 502 can be any system that processes previous load data, e.g., that defines load measurements for time points previous to a current time point, to generate a baseline load forecast that defines predicted baseline load measurements for time points after a current time point. An example implementation of a load forecasting system is described in more detail with reference to FIG. 1-2.

After generating the baseline load simulation 510 and the baseline load forecast 514, the system 500 determines the baseline simulation error 516 as the error between the baseline load simulation 510 and the baseline load forecast 514. For example, the system 500 may determine the baseline simulation error 516 at each time point as the difference between the baseline load simulation 510 at the time point and the baseline load forecast 514 at the time point. The baseline load simulation 510 and the baseline load forecast 514 are both estimates of the load generated by the population of energy consuming devices if the load adjustment event is not performed. However, the baseline load simulation 510 and the baseline load forecast 514 are generated by different predictive processes, and as a result, are generally different.

The inference engine 504 is configured to process the baseline simulation error 516 to generate the load adjustment simulation error 324, e.g., that estimates the error between the load adjustment simulation and the actual load during the hypothetical load adjustment event.

As part of determining the load adjustment simulation error 324, the inference engine 504 accesses a set of stored historical data 518 that characterizes multiple previous load adjustment events, including: (i) the baseline simulation error, and (ii) the load adjustment simulation error, for each previous load adjustment event. The baseline simulation error for the previous load adjustment event refers to an error between a baseline load simulation and a baseline load forecast for the previous load adjustment event. The load adjustment simulation error for the previous load adjustment event refers to an error between a load adjustment simulation and the actual load during the previous load adjustment event.

Optionally, the historical data 518 may characterize additional features of the previous load adjustment event, e.g., the duration of a preconditioning event that was performed prior to the previous load adjustment event. A preconditioning event may be a precooling event that includes lowering temperature set points for cooling systems for a duration of time prior to performance of a load adjustment event during which the temperature set points for the cooling system are increased to reduce energy consumption. As another example, a preconditioning event may be a preheating event that includes increasing temperature set points for heating systems for a duration of time prior to performance of a load adjustment event during which the temperature set points for the heating system are decreased to reduce energy consumption. Preconditioning events may be performed, e.g., to increase the comfort of the occupants of homes during the load adjustment event by storing heat or coolness in the homes prior to the load adjustment event.

To determine the load adjustment simulation error, the inference engine 504 may determine a respective weight factor corresponding to each previous load adjustment event included in the historical data 518. The inference engine 504 determines the weight factor for a previous load adjustment event based on at least: (i) the baseline simulation error 516 for the hypothetical load adjustment event, and (ii) the baseline simulation error for the previous load adjustment event. In one example, the inference engine 504 may determine the weight factor for a previous load adjustment event to be a similarity measure (e.g., a Euclidean similarity measure) between an embedding of the hypothetical load adjustment event and an embedding of the previous load adjustment event. An "embedding" refers to an ordered collection of numerical values, e.g., a vector or matrix of numerical values. The inference engine 504 may determine the embedding of a load adjustment event, e.g., to include a component having a value defined by a combination (e.g., a sum or average) of the values of the baseline simulation error for the load adjustment event. The embedding of the load adjustment event may include another component having a value defined by a duration of a preconditioning event performed prior to the load adjustment event.

The inference engine 504 may determine the load adjustment simulation error 324 for the hypothetical load adjustment event using the weight factors corresponding to the previous load adjustment events in a variety of ways. In one example, the inference engine 504 may determine the load adjustment simulation error 324 for the hypothetical load adjustment event to be equal to the load adjustment simulation error for the previous load adjustment event having the highest weight factor. In another example, the inference engine 504 may normalize the weight factors for the previous load adjustment events, e.g., by processing them using a soft-max function, and scale the load adjustment simulation error for each previous load adjustment event by the corresponding normalized weight factor. The inference engine 504 may then determine the load adjustment simulation error 324 for the hypothetical load adjustment event to be a sum of the scaled load adjustment simulation errors for the previous load adjustment events.

The stored historical data 518 used by the inference engine 504 to determine the load adjustment simulation error 324 may be periodically updated (e.g., weekly or monthly) using the most recent historical data.

Figure 6:
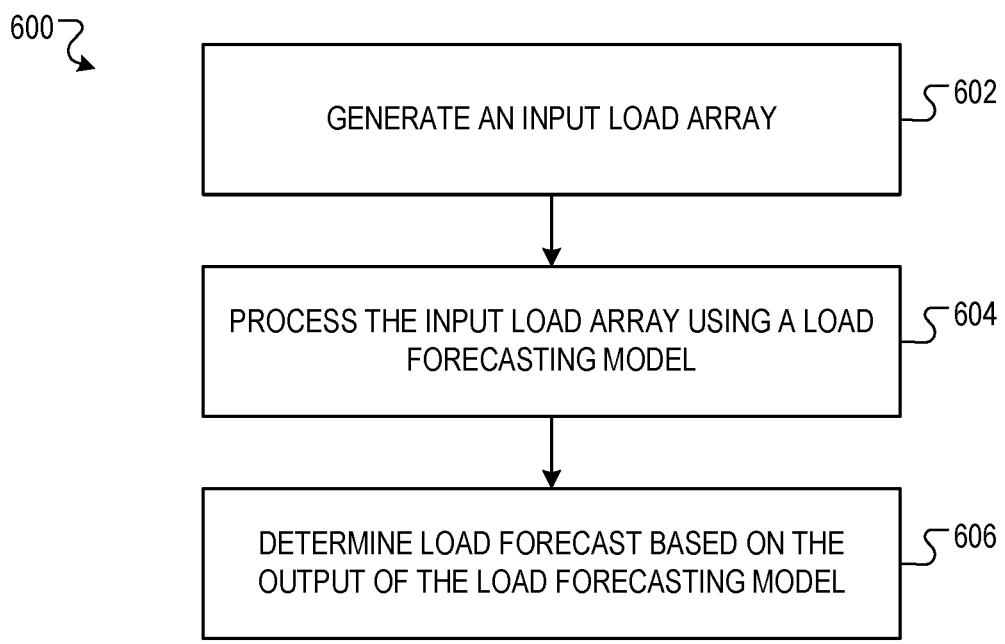
FIG. 6 is a flow diagram of an example process for generating a load forecast that estimates load measurements at future time points resulting from load generated by a population of energy consuming devices.

FIG. 6 is a flow diagram of an example process 600 for generating a load forecast that estimates load measurements at future time points resulting from load generated by a population of energy consuming devices. For convenience, the process 600 will be described as being performed by a system of one or more computers located in one or more locations. For example, a load forecasting system, e.g., the load forecasting system 100 of FIG. 2, appropriately programmed in accordance with this specification, can perform the process 600.

The system generates an input (masked) load array that includes a respective load value for each of multiple time points (602). The input load array includes load values for previous time points that define load measurements at the previous time points and load values for the future time points that are masked values.

The system processes the input load array using a load forecasting model to unmask the masked values corresponding to the future time points (604). The load forecasting model output defines a predicted load measurement for each future time point.

The system determines the load forecast based on the load forecasting model output (606).

Figure 7:
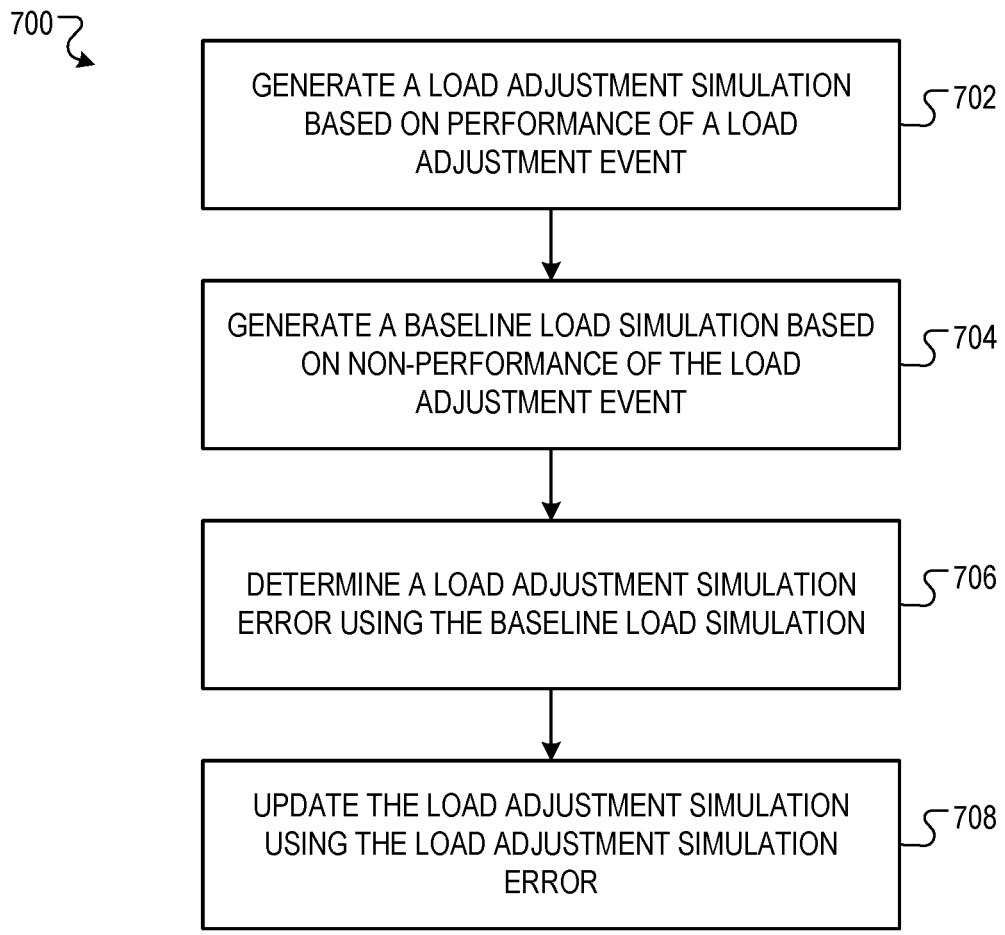
FIG. 7 is a flow diagram of an example process for predicting energy consumption by a population of energy consuming devices based on performance of a current load adjustment event.

FIG. 7 is a flow diagram of an example process 700 for predicting energy consumption by a population of energy consuming devices based on performance of a current load adjustment event. For convenience, the process 700 will be described as being performed by a system of one or more computers located in one or more locations. For example, a capacity forecasting system, e.g., the capacity forecasting system 300 of FIG. 4, appropriately programmed in accordance with this specification, can perform the process 700.

The system uses a simulation system to generate a load adjustment simulation that characterizes predicted energy consumption by a population of energy consuming devices based on performance of a current load adjustment event (702).

The system uses the simulation system to generate a baseline load simulation that characterizes predicted energy consumption by the population of energy consuming devices based on non-performance of the current load adjustment event (704).

The system uses the baseline load simulation to determine a load adjustment simulation error that is an estimate of an error between: (i) the load adjustment simulation, and (ii) actual energy consumption by the population of energy consuming devices based on performance of the current load adjustment event (706).

The system updates the load adjustment simulation using the load adjustment simulation error (708).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
generating, using a simulation system comprising one or more computers, a load adjustment simulation that characterizes first predicted energy consumption by a population of energy consuming devices based on performance of a current load adjustment event;
generating, using the simulation system, a baseline load simulation that characterizes second predicted energy consumption by the population of energy consuming devices as if the current load adjustment event were not performed, wherein the second predicted energy consumption is a different prediction using the baseline load simulation than the first predicted energy consumption using the load adjustment simulation;
determining, using the baseline load simulation as a weighting factor, a load adjustment simulation error that is an estimate of an error between: (i) the load adjustment simulation, and (ii) actual energy consumption by the population of energy consuming devices based on performance of the current load adjustment event;
updating the load adjustment simulation using the load adjustment simulation error; and
controlling, using the updated load adjustment simulation, one or more of devices from the population of energy consuming devices.

2. The method of claim 1, wherein generating the load adjustment simulation uses a respective energy consumption model for each device in the population of energy consuming devices to simulate energy consumption by the device based on one or more controls applied to the device to control operation of the device.

3. The method of claim 2, wherein generating the load adjustment simulation comprises:
simulating energy consumption by each device in the population of energy consuming devices based on performance of the current load adjustment event using the respective energy consumption model for each device; and
generating the load adjustment simulation by aggregating the simulated energy consumption by each device in the population of energy consuming devices based on performance of the current load adjustment event.

4. The method of claim 2, wherein generating the baseline load simulation comprises:
simulating energy consumption by each device in the population of energy consuming devices as if the current load adjustment event were not performed using the respective energy consumption model for each device; and
generating the baseline load simulation by aggregating the simulated energy consumption by each device in the population of energy consuming devices as if the current load adjustment event were not performed.

5. The method of claim 1, wherein determining the load adjustment simulation error comprises:
processing data characterizing previous energy consumption by the population of energy consuming devices using a load forecasting system to generate a baseline load forecast that characterizes predicted energy consumption by the population of energy consuming devices as if the current load adjustment event were not performed;
determining a current baseline simulation error between: (i) the baseline load simulation, and (ii) the baseline load forecast; and
determining the load adjustment simulation error based on baseline simulation error.

6. The method of claim 5, wherein determining the load adjustment simulation error based on the baseline simulation error comprises:
determining a respective baseline simulation error for each of a plurality of previous load adjustment events;
determining a respective weight factor for each previous load adjustment event based on:
(i) the baseline simulation error for the previous load adjustment event, and (ii) the current baseline simulation error for the current load adjustment event; and
determining the load adjustment simulation error using the weight factors for the previous load adjustment events.

7. The method of claim 6, wherein determining the load adjustment simulation error using the weight factors for the previous load adjustment events comprises:
determining a respective load adjustment simulation error for each of the plurality of previous load adjustment events;
scaling the load adjustment simulation error for each previous load adjustment event by the weight factor for the previous load adjustment event; and
determining the load adjustment simulation error for the current load adjustment event by combining the load adjustment simulation errors for the previous load adjustment events in accordance with the weight factors for the previous load adjustment events.

8. The method of claim 7, wherein determining the load adjustment simulation error for the current load adjustment event by combining the load adjustment simulation errors for the previous load adjustment events in accordance with the weight factors for the previous load adjustment events comprises:
scaling the load adjustment simulation error for each previous load adjustment event by the weight factor for the previous load adjustment event; and
summing the load adjustment simulation errors for the previous load adjustment events.

9. A system comprising:
one or more computers; and
one or more storage devices communicatively coupled to the one or more computers, wherein the one or more storage devices store instructions that, when executed by the one or more computers, cause the one or more computers to perform operations comprising:
generating a load adjustment simulation that characterizes first predicted energy consumption by a population of energy consuming devices based on performance of a current load adjustment event;
generating a baseline load simulation that characterizes second predicted energy consumption by the population of energy consuming devices as if the current load adjustment event were not performed, wherein the second predicted energy consumption is a different prediction using the baseline load simulation than the first predicted energy consumption using the load adjustment simulation;
determining, using the baseline load simulation as a weighting factor, a load adjustment simulation error that is an estimate of an error between: (i) the load adjustment simulation, and (ii) actual energy consumption by the population of energy consuming devices based on performance of the current load adjustment event;

updating the load adjustment simulation using the load adjustment simulation error; and controlling, using the updated load adjustment simulation, one or more of devices from the population of energy consuming devices.

10. The system of claim 9, wherein generating the load adjustment simulation uses a respective energy consumption model for each device in the population of energy consuming devices to simulate energy consumption by the device based on one or more controls applied to the device to control operation of the device.

11. The system of claim 10, wherein generating the load adjustment simulation comprises:

simulating energy consumption by each device in the population of energy consuming devices based on performance of the current load adjustment event using the respective energy consumption model for each device; and generating the load adjustment simulation by aggregating the simulated energy consumption by each device in the population of energy consuming devices based on performance of the current load adjustment event.

12. The system of claim 10, wherein generating the baseline load simulation comprises:

simulating energy consumption by each device in the population of energy consuming devices as if the current load adjustment event were not performed using the respective energy consumption model for each device; and generating the baseline load simulation by aggregating the simulated energy consumption by each device in the population of energy consuming devices as if the current load adjustment event were not performed.

13. The system of claim 9, wherein determining the load adjustment simulation error comprises:

processing data characterizing previous energy consumption by the population of energy consuming devices using a load forecasting system to generate a baseline load forecast that characterizes predicted energy consumption by the population of energy consuming devices as if the current load adjustment event were not performed;

determining a current baseline simulation error between: (i) the baseline load simulation, and (ii) the baseline load forecast; and determining the load adjustment simulation error based on baseline simulation error.

14. The system of claim 13, wherein determining the load adjustment simulation error based on the baseline simulation error comprises:

determining a respective baseline simulation error for each of a plurality of previous load adjustment events;

determining a respective weight factor for each previous load adjustment event based on: (i) the baseline simulation error for the previous load adjustment event, and (ii) the current baseline simulation error for the current load adjustment event; and determining the load adjustment simulation error using the weight factors for the previous load adjustment events.

15. The system of claim 14, wherein determining the load adjustment simulation error using the weight factors for the previous load adjustment events comprises:

determining a respective load adjustment simulation error for each of the plurality of previous load adjustment events;

scaling the load adjustment simulation error for each previous load adjustment event by the weight factor for the previous load adjustment event; and determining the load adjustment simulation error for the current load adjustment event by combining the load adjustment simulation errors for the previous load adjustment events in accordance with the weight factors for the previous load adjustment events.

16. The system of claim 15, wherein determining the load adjustment simulation error for the current load adjustment event by combining the load adjustment simulation errors for the previous load adjustment events in accordance with the weight factors for the previous load adjustment events comprises:

scaling the load adjustment simulation error for each previous load adjustment event by the weight factor for the previous load adjustment event; and summing the load adjustment simulation errors for the previous load adjustment events.

17. One or more non-transitory computer storage media storing instructions that when executed by one or more computers cause the one or more computers to perform operations comprising:

generating a load adjustment simulation that characterizes first predicted energy consumption by a population of energy consuming devices based on performance of a current load adjustment event;

generating a baseline load simulation that characterizes second predicted energy consumption by the population of energy consuming devices as if the current load adjustment event were not performed, wherein the second predicted energy consumption is a different prediction using the baseline load simulation than the first predicted energy consumption using the load adjustment simulation;

determining, using the baseline load simulation as a weighting factor, a load adjustment simulation error that is an estimate of an error between: (i) the load adjustment simulation, and (ii) actual energy consumption by the population of energy consuming devices based on performance of the current load adjustment event;

updating the load adjustment simulation using the load adjustment simulation error; and controlling, using the updated load adjustment simulation, one or more of devices from the population of energy consuming devices.

18. The non-transitory computer storage media of claim 17, wherein generating the load adjustment simulation uses a respective energy consumption model for each device in the population of energy consuming devices to simulate energy consumption by the device based on one or more controls applied to the device to control operation of the device.

19. The non-transitory computer storage media of claim 18, wherein generating the load adjustment simulation comprises:

simulating energy consumption by each device in the population of energy consuming devices based on performance of the current load adjustment event using the respective energy consumption model for each device; and generating the load adjustment simulation by aggregating the simulated energy consumption by each device in the population of energy consuming devices based on performance of the current load adjustment event.

20. The non-transitory computer storage media of claim 18, wherein generating the baseline load simulation comprises:
simulating energy consumption by each device in the population of energy consuming devices as if the current load adjustment event were not performed using the respective energy consumption model for each device; and
generating the baseline load simulation by aggregating the simulated energy consumption by each device in the population of energy consuming devices as if the current load adjustment event were not performed.

* * * * *

UNITED STATES PATENT AND TRADEMARK OFFICE
CERTIFICATE OF CORRECTION

| | |
|---|---|
| PATENT NO. | : 11,687,689 B2 |
| APPLICATION NO. | : 17/019983 |
| DATED | : June 27, 2023 |
| INVENTOR(S) | : Benjamin Hertz-Shargel, Varun Mehra and Michael DeBenedittis |

It is certified that error appears in the above-identified patent and that said Letters Patent is hereby corrected as shown below:

On the Title Page

Column 1 (item (73), Assignee), Line 1, delete "Energy Hub," and insert -- EnergyHub, --.

Signed and Sealed this
Fifteenth Day of August, 2023

Katherine Kelly Vidal
*Director of the United States Patent and Trademark Office*